United States Patent
Fatemi et al.

(10) Patent No.: US 10,811,946 B1
(45) Date of Patent: Oct. 20, 2020

(54) CYCLOIDAL RELUCTANCE MOTOR WITH ROTOR PERMANENT MAGNETS

(71) Applicant: GM Global Technology Operations LLC, Detroit, MI (US)

(72) Inventors: Alireza Fatemi, Canton, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 16/372,791

(22) Filed: Apr. 2, 2019

(51) Int. Cl.
| | |
|---|---|
| H02K 21/16 | (2006.01) |
| H02K 11/00 | (2016.01) |
| H02K 21/02 | (2006.01) |
| H02K 7/00 | (2006.01) |
| H02K 11/33 | (2016.01) |
| B60L 50/60 | (2019.01) |

(52) U.S. Cl.
CPC .......... H02K 21/029 (2013.01); H02K 7/006 (2013.01); H02K 11/0094 (2013.01); H02K 11/33 (2016.01); H02K 21/16 (2013.01); B60L 50/60 (2019.02); B60Y 2200/91 (2013.01); B60Y 2400/60 (2013.01); H02K 2201/18 (2013.01)

(58) Field of Classification Search
CPC ...... H02K 21/029; H02K 21/16; H02K 7/006; H02K 11/0094; H02K 11/33; H02K 2201/18; H02K 1/246; H02K 1/24; B60Y 2200/91; B60Y 2400/60; B60L 50/60

USPC .................................. 310/216.075, 216.107
See application file for complete search history.

(56) References Cited

U.S. PATENT DOCUMENTS

| | | | |
|---|---|---|---|
| 4,914,330 | A | 4/1990 | Pierrat |
| 5,448,117 | A | 9/1995 | Elliott |
| 9,669,701 | B2 | 6/2017 | Bolt |
| 9,890,832 | B2 | 2/2018 | Kurth et al. |
| 10,023,406 | B2 | 7/2018 | Klubertanz et al. |
| 10,090,747 | B2 | 10/2018 | Hofmeister |
| 2008/0289440 | A1* | 11/2008 | Denk ............ F16C 31/00 74/89.34 |
| 2010/0123426 | A1* | 5/2010 | Nashiki ............ H02K 1/12 318/701 |

\* cited by examiner

Primary Examiner — Thomas Truong
(74) Attorney, Agent, or Firm — Quinn IP Law (57) ABSTRACT

An electrical system includes a power inverter connected to a battery and outputting a polyphase voltage, and a cycloidal reluctance machine. A machine rotor provides output torque, and is surrounded and separated from the stator by an airgap. The rotor includes permanent magnets providing a fixed-orientation rotor field. The stator includes windings proximate the permanent magnets and electrically connected to the inverter to form stator electromagnets. The rotor field augments the stator field to boost output torque. The rotor is eccentrically positioned with respect to the stator to move with two degrees of freedom (2DOF), including rotating motion and orbiting motion about a center axis of the stator. A rotor constraint mechanism constrains motion of the rotor, such that the rotor is able to generate and transmit the output torque to a coupled load in at least one of the 2DOF.

20 Claims, 5 Drawing Sheets

CYCLOIDAL RELUCTANCE MOTOR WITH ROTOR PERMANENT MAGNETS

INTRODUCTION

Rotary electric machines configured as motors or electric generators include a rotating member ("rotor") and a stationary member ("stator"). The rotor may be disposed radially within or radially outside of the stator, such that the stator respectively surrounds or is surrounded by the rotor. Equally-spaced radial slots around a perimeter of a stator core are wound with lengths of conductive wire or bar conductor segments. In an alternating current (AC) machine configuration, a polyphase input voltage is applied to phase leads of the stator windings to generate a rotating magnetic field with respect to the stator core. In a permanent magnet (PM)-type of rotary electric machine, permanent magnets are arranged on and/or embedded within individual laminations of the rotor. In other configurations such as induction and reluctance machines, the rotor is generally characterized by an absence of such permanent magnets.

Of the various possible AC rotary electric machine types, the above-noted reluctance machine is of particular use in relatively high-power/high-torque applications. In a variable reluctance machine, for instance, magnetic poles are induced in a ferrous rotor when the stator windings are sequentially energized by an applied AC voltage. Forces due to magnetic reluctance of the rotor causes the rotor poles to align with the nearest stator pole. That is, magnetic flux follows the path of least reluctance, and thus the nearest rotor pole will tend to move into alignment with the stator field.

Since the stator field continues to rotate, the resulting rotation of the rotor is continuous, with the stator pole leading the rotor pole so as to produce the desired machine rotation. Torque imparted by such rotation may be harnessed using gear sets and/or pulleys, and thereafter used to produce useful work in a system. For example, motor torque may be delivered to a coupled load via a drive axle. Alternatively, when the electric machine operates as an electric generator, an internal combustion engine, turbine, or other prime mover may be used to power the rotor and thereby produce a resulting electric current in the stator windings. The generated electric current is thereafter passed through a power inverter and used to charge constituent battery cells of a battery pack.

SUMMARY

The present disclosure relates generally to radial flux-type rotary electric machines, and in particular to a cycloidal reluctance machine having a stator and an eccentrically-positioned rotor. Such a rotor is positioned radially within the stator, such that the rotor is circumscribed by the stator. The rotor of a reluctance machine ordinarily lacks an independent rotor field, i.e., a field originating from the rotor. However, the lack of an independent rotor field may be suboptimal in certain applications, such as in the presently disclosed eccentric/cycloidal reluctance machine. For instance, the lack of an independent rotor field may result in under-utilized active material and suboptimal torque generation.

To counter this potential performance problem in applications using the cycloidal reluctance machine described herein, a collection of permanent magnets ("rotor magnets") are incorporated into the rotor structure to provide a lossless magnetic field. This independent rotor field boosts the torque capability of the reluctance machine, as well as improves the machine's overall operating efficiency.

The rotor magnets may be surface-mounted to an outer diameter/perimeter of the rotor, a position that may help improve flux linkage with the stator. Alternatively, the rotor magnets may be inset into or embedded within laminations of the rotor for reduced demagnetization and potentially higher operating efficiencies.

The rotor magnets may be optionally segmented for reduced losses and additional flexibility in constructing an optimal rotor field. The direction of magnetization of the rotor magnets could be radial to the center of the rotor or parallel to the thickness of the stator electromagnets in different embodiments.

The cycloidal reluctance machine in a possible configuration has an even number of rotor poles, with the number of stator poles being even or odd. An embodiment includes a number of stator poles that equals the number of electrical phases used to energize the stator windings, e.g., three stator poles in conjunction with a three-phase AC input voltage.

In a disclosed embodiment, an electrical system includes a power inverter connected to the battery and outputting a polyphase voltage, and a cycloidal reluctance machine. The reluctance machine has a rotor providing an output torque, surrounded by a stator, and separated from the stator by an airgap. The rotor includes permanent rotor magnets providing a rotor field, with such magnets arranged on ("surface mounted") or inset ("embedded") in the rotor. The stator includes stator windings positioned proximate the rotor magnets and electrically connected to the power inverter to thereby form stator electromagnets having a rotating stator field. The rotor field augments the rotating stator field to boost output torque of the cycloidal reluctance machine.

As noted above, the rotor is eccentrically positioned with respect to the stator to move with 2DOF, i.e., rotating motion about a rotary axis of the rotor and orbiting motion about a center axis of the stator. A rotor constraint mechanism is configured to constrain motion of the rotor, such that the rotor is able to generate and transmit the output torque to a coupled load in at least one of the 2DOF.

The rotor has orthogonally-arranged first and second axes determined with respect to the reference center of rotation, such that the rotor has opposing symmetrical halves. In some embodiments in which the rotor magnets are embedded in the rotor, the rotor magnets have orthogonally-arranged first and second segments. The first segments are parallel to the first axis, and the second segments are parallel to the second axis. In other embedded magnet embodiments, the respective first end of each of the rotor magnets may be oriented toward the first axis in each symmetrical half, with a second end of the each of the rotor magnets oriented toward the second axis in each symmetrical half.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 1:
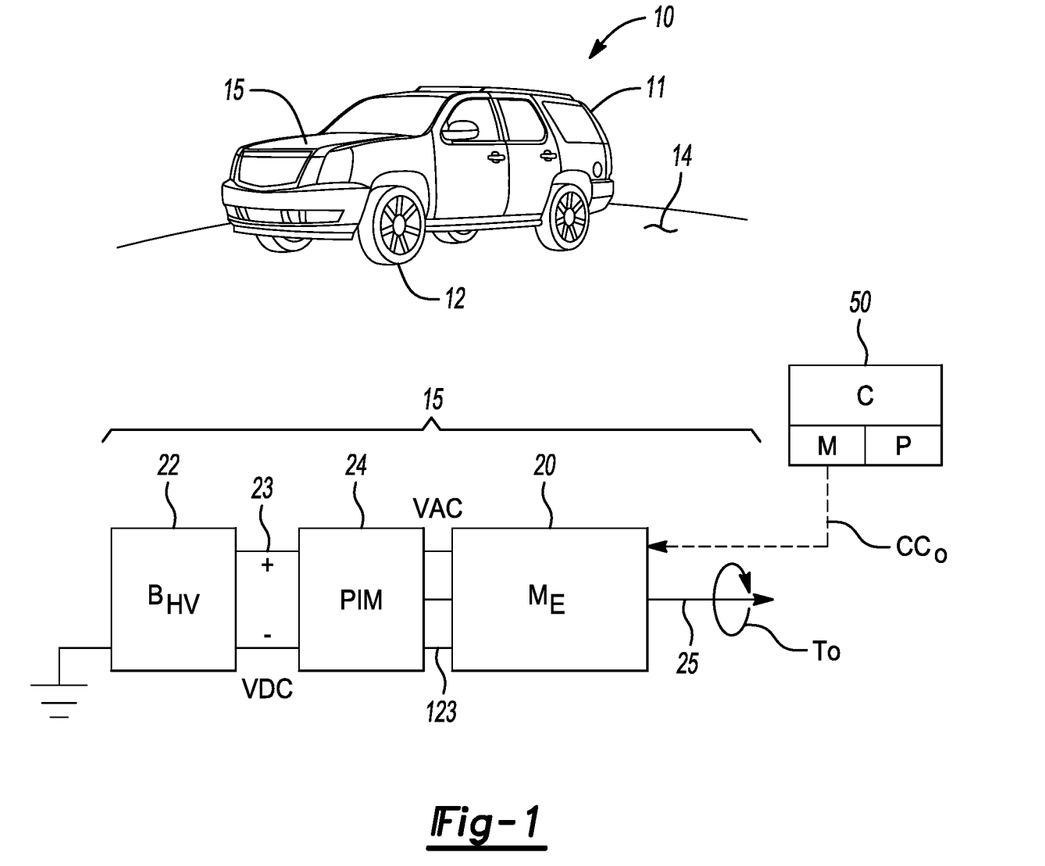
FIG. 1 is a schematic illustration of an example electrical system having a cycloidal electric motor as described herein.

Referring to the drawings, wherein like reference numbers refer to the same or like components in the several Figures, an electrical system 15 is shown schematically in FIG. 1. The electrical system 15 described herein may be used as part of a vehicle 10 having a vehicle body 11, e.g., a motor vehicle having a set of road wheels 12 in rolling contact with a road surface 14. The electrical system 15 may also be used in other types of vehicles 10, for instance aircraft, watercraft, and rail vehicles, or in other mobile, non-vehicular applications such as robots and mobile platforms. Stationary applications may likewise benefit from use of the electrical system 15 as set forth below, and therefore the vehicle 10 of FIG. 1 is just one possible beneficial application of the present teachings.

Figure 2:
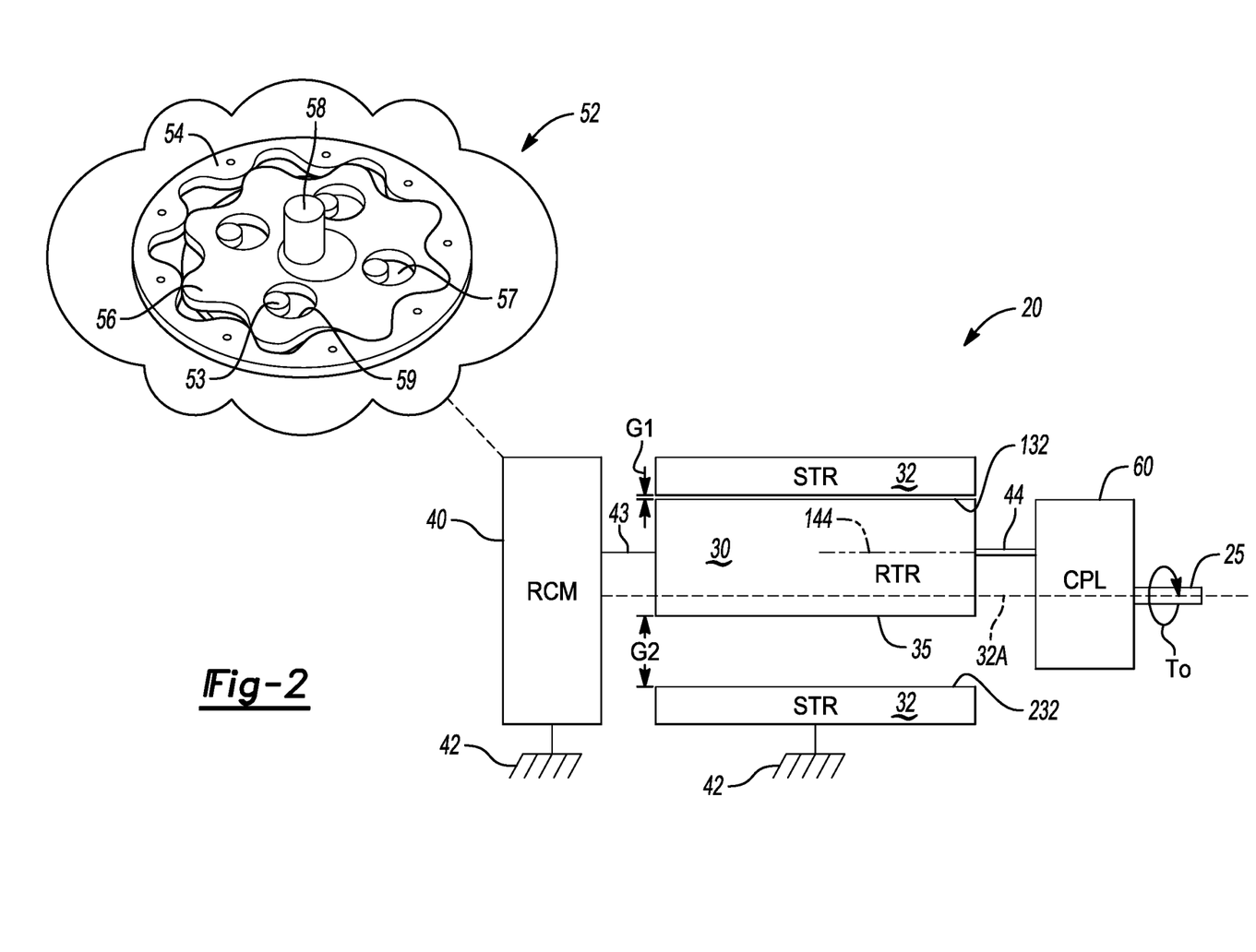
FIG. 2 is a schematic illustration of an electric machine with integral or separate cycloidal gear set features, and usable as part of the electrical system shown in FIG. 1.

The electrical system 15 includes a rotary cycloidal electric machine ($M_E$) 20 having an output member 25 coupled to a balanced rotor 30 (see FIG. 2). As used herein, the term "balanced" with respect to the rotor 30 and the electric machine 20 in general may be defined as a threshold low level of noise, vibration, and harshness (NVH) during sustained operation of the rotor 30, such that the rotor 30 does not perceptibly wobble or vibrate beyond the constrained two degrees of freedom (2DOF) detailed herein.

The cycloidal electric machine 20 of the present disclose may be embodied as a modified reluctance machine of the type generally described above. As will be understood by those of ordinary skill in the art, reluctance machines, e.g., synchronous, switched, or variable reluctance machines, are ordinarily characterized by an absence of permanent magnets on the rotor 30. Instead, such machines operate via the creation of non-permanent magnetic rotor poles to generate output torque (arrow $T_O$) using the principle of magnetic reluctance. The present rotor 30, however, is a purposefully-modified variation in which a rotor field is provided via the use of purposefully oriented permanent magnets in the manner set forth below. The disclosed approach is intended to optimize active material utilization within the electric machine 20 and increase overall torque capability.

Figure 3:
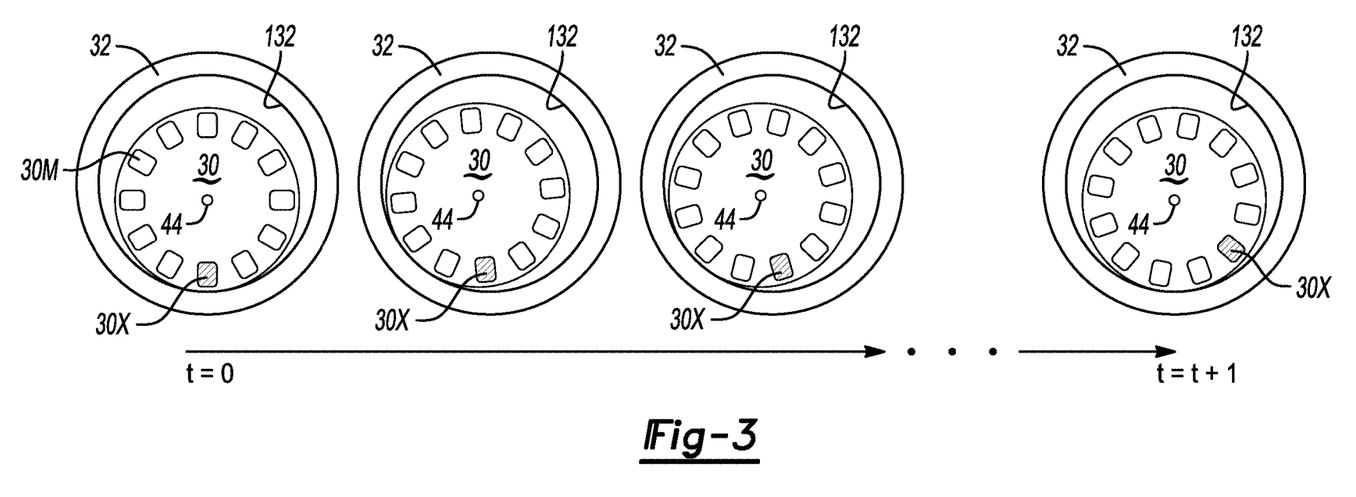
FIGS. 3 and 4 are schematic illustrations of respective rotating and orbiting motion of a rotor of the cycloidal electric machine of FIG. 2.
Figure 4:
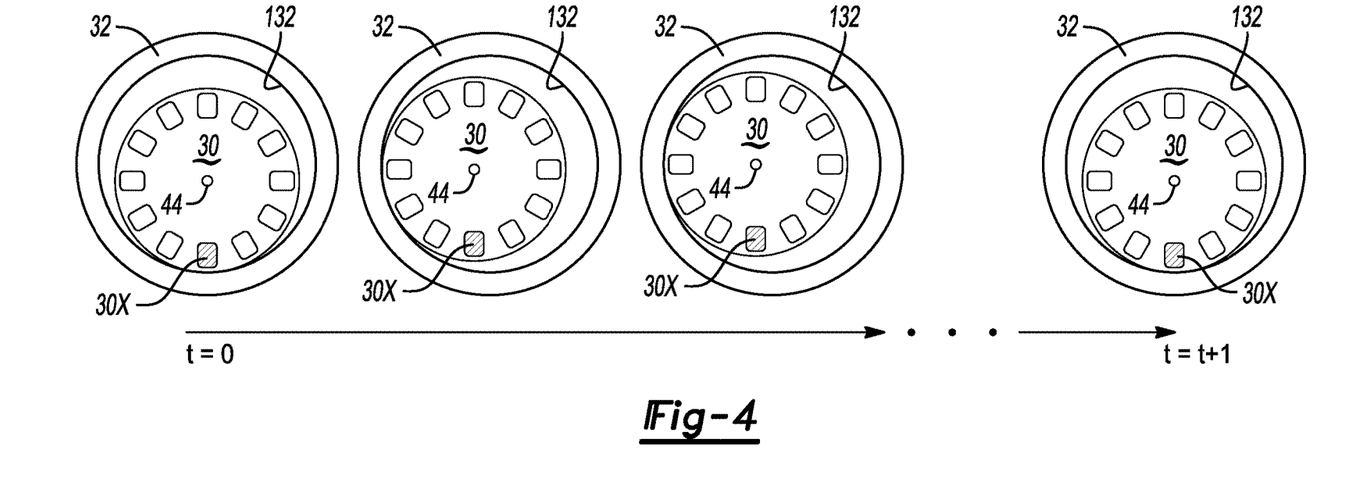

The cycloidal electric machine 20 depicted in FIGS. 1-3 is operable for providing motion with 2DOF, i.e., rotary and orbiting motion, as respectively detailed in FIGS. 3 and 4.

Certain enhancements to the cycloidal electric machine 20 may be included within the scope of the disclosure, with example embodiments described below with particular reference to FIGS. 5-9. Collectively, the present teachings are intended to make beneficial use of otherwise largely unused radial airgap forces in the overall composition of the output torque (arrow $T_O$) of such a cycloidal electric machine 20, and to optimize generation and delivery of the output torque (arrow $T_O$) via the use of a rotor field as described below.

In the illustrated example embodiment of FIG. 1, the electrical system 15 includes a battery ($B_{HV}$) 22 and a power inverter module (PIM) 24. Options for the structure and control of the PIM 24 are described in further detail below with reference to FIG. 9. The battery 22 may have a relatively high voltage capacity, e.g., 60-volts or more depending on the embodiment, with "high-voltage" indicated by subscript "HV". The cycloidal electric machine 20 may be embodied as a polyphase electric motor and thus electrically connected to an AC bus 123, with the electric machine 20 energized by an AC voltage (VAC) from the PIM 24. The PIM 24 in turn is connected to the battery 22 via a DC voltage bus 23, with a DC voltage (VDC) supplied by the DC voltage bus 23 to the PIM 24 and vice versa depending on whether the cycloidal electric machine 20 functions as a motor or as a generator.

When energized, the cycloidal electric machine 20 generates and outputs the above-noted output torque (arrow $T_O$) to a driven load via the output member 25, for instance to a connected drive axle and/or the drive wheels 12 of the vehicle 10. Operation of the electrical system 15 may be regulated by a controller (C) 50 via control signals (arrow $CC_O$). The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

Referring to FIG. 2, the rotor (RTR) 30 of the cycloidal electric machine 20 is eccentrically-positioned. With respect to such eccentricity, the rotor 30 is radially-separated from the surrounding stator 32 by an airgap (G1, G2). The size of the airgap (G1, G2) varies in conjunction with the orbiting position of the rotor 30 relative to the stator 32. The electric machine 20 is thus "cycloidal" in the sense that the rotor 30 is constrained to move with two degrees of freedom (2DOF): (1) rotary motion about the axis of rotation 144 of the rotor 30, and (2) orbiting motion about the axis 32A of the stator 32.

For a typical rotary electric machine, electromagnetic torque that is present within the above-noted airgap (G1, G2) may be derived according to the following equation [1], with t and r respectively denoting radial and tangential torque components in an example cylindrical coordinate system:

$$T_e = F_t R L_{ef} \qquad [1]$$

In equation [1], $T_e$ is the electromagnetic torque in newton-meters, R is the average radius of the airgap in meters, $L_{ef}$ if the effective stack length of the active materials of the electric machine, also in meters, and $F_t$ is the tangential forces present within the airgap in newtons. The tangential forces, $F_t$, are defined as:

$$F_t = \frac{P}{2} \int_0^{2\pi} f_t(\phi_r) R d\phi_r \qquad [2]$$

where P is the number of poles of the hypothetical electric machine, $f_t$ represents the tangential component of the airgap force density per unit length, and $\phi_r$ is the electrical angle covering each pole pair in radians.

According to the relationships expressed in the above-noted equations [1] and [2], the radial airgap forces, which are several times larger than the machine's tangential forces, do not contribute to the output torque of the electric machine. The disclosed embodiments of the cycloidal electric machine 20 therefore incorporate otherwise unused radial airgap forces when producing the output torque (arrow $T_O$), assisted by rotor magnets 30M, 130M, or 230M (see FIGS. 5-9) having a direction of magnetization with a fixed field orientation, so as to realize certain performance advantages, including enabling output of higher levels of output torque (arrow $T_O$) at lower motor speeds.

The rotor 30 of FIG. 2, with its arranged permanent magnets omitted for simplicity and clarity but described below, is radially disposed with respect to stator (STR) 32, which may be grounded to a stationary member 42 as shown. The electric machine 20 may include a housing (not shown) in which the rotor 30, the stator 32, and other components are disposed and structurally supported. The stator 32 may be separated from the rotor 30 by an airgap (G1, G2), or the stator 32 may be in continuous contact with the rotor 30 at the instantaneous center of motion without sliding against an outer surface 35 of the rotor 30. The eccentric positioning of the rotor 30 provides the rotor 30 with the above-noted 2DOF, i.e., rotating motion and orbiting motion.

The rotor 30 is eccentrically-positioned and disposed radially within the stator 32, i.e., surrounded or circumscribed by the stator 32 in the schematically-illustrated example cylindrical embodiment of FIG. 2. The rotor 30 moves with rotating motion about a rotor axis 144, and orbiting motion around the stator axis 32A of the stator 32, with the stator axis 32A also referred to herein as the stator axis 32A. The rotor 30 and stator 32 may be mutually-separated from each other in some configurations by the airgap (G1, G2). That is, depending on the orbiting position of the rotor 30 within the stator 32, the rotor 30 may be closer to a topmost inner circumferential surface 132, shown in FIG. 2 as corresponding airgap G1, at which position the rotor 30 is located farther from a bottommost part, i.e., 232, of the inner circumferential surface 132 of the stator 32, with the corresponding larger corresponding airgap G2. As the rotor 30 orbits within the stator 32, the relative size of the airgap at a given point around the inner perimeter of the stator 32 will change, i.e., airgap G2 becomes smaller than airgap G1 whenever the rotor 30 orbits 180-degrees away from the position depicted in FIG. 2. The airgap (G1, G2) may be zero in other embodiments, such as when a multi-lobed cycloidal disc 56 is integrated into the structure of the rotor 30 as described below.

The electric machine 20 is connected to or includes a rotor constraint mechanism (RCM) 40. The RCM 40 is configured to constrain motion of the rotor 30 such that the rotor 30 is able to generate useful application-specific torque on a coupled load. In certain embodiments, portions of the RCM 40 may be integrally formed with the structure of the rotor 30, while in other embodiments the RCM 40 may be embodied as an external set of components, e.g., portions of a cycloidal gear set 52 powering an output shaft 58, with a direction of rotation of the output shaft 58 being opposite that of the rotor 30 and its rotor output member 44.

General operation of the electric machine 20 may be understood with reference to the cycloidal gear set 52 shown as an inset in the upper left corner of FIG. 2. The cycloidal gear set 52 has a grounded/stationary outer ring gear element 54, within which is disposed the cycloidal disc 56. The cycloidal disc 56 defines equally-spaced holes 59. Pins 53, e.g., cylindrical posts as shown, may axially-extend from a gear element 57. The particular 2DOF motion enabled by the cycloidal gear set 52 will be appreciated by one of ordinary skill in the art, e.g., as a speed reduction mechanism.

The electrical system 15 shown in FIG. 1 may bodily incorporate certain structural functional aspects of the example cycloidal gear set 52 into its constituent structure without bodily incorporating the cycloidal gear set 52 itself. For instance, the function of the stationary outer ring gear element 54 and the cycloidal disc 56 may be combined into the structure and function of the RCM 40, with an input member 43 of the rotor 30 bolted to structure of the RCM 40 corresponding to the cycloidal disc 56. Such structure enables the rotor 30 to be constrained so as to rotate about the rotor axis 144 and, at the same time, to orbit about the stator axis 32A.

The disclosed arrangement uses a rotor magnetic field to produce higher levels of output torque (arrow $T_O$) from the electric machine 20. At least part of the RCM 40 may be integrally formed with the rotor 30 in certain embodiments. For instance, a profile of the rotor 30 may be constructed to approximate or match a profile of the illustrated cycloidal disc 56 of the example cycloidal gear set 52, with the stator 32 being similarly constructed to form the mating profile of the outer ring gear element 54.

The rotor 30 and/or the electric machine 20 may be optionally connected to a coupling mechanism (CPL) 60. The CPL 60 is configured to translate rotation of the rotor 30 from the rotor axis 144 to a driven load. The CPL 60 may be positioned downstream of the rotor 30, i.e., coupled to the output member 44 of the rotor 30 and configured to translate the 2DOF motion of the rotor 30 into 1DOF motion. As used herein, the term "1DOF motion" describes rotation of the rotor 30 and a connected driven load without orbiting motion. So, when the driven load is the above-noted drive axle or drive wheels 12 of the representative vehicle 10 shown in FIG. 1, the 1DOF motion of the rotor 30 powers the drive axle.

Various embodiments may be envisioned for implementing the CPL 60, including but not limited to an Oldham coupling mechanism. As will be appreciated, Oldham couplings utilize a compact arrangement of discs, i.e., an input-coupled disc, an output-coupled disc, and a rotating middle disc joined to the input- and output-coupled discs by a mating tongue-and-groove connection. Alternatively, the post-and-hole configuration shown in the cycloidal gear set 52 of FIG. 2 may be used, or a gear train constructed of multiple spur gears may be employed to the same ends, with these being just a few possible ways to implement the CPL 60.

As disclosed above, use of the CPL 60 within the example electrical system 15 of FIG. 1 is optional. That is, certain applications may be readily envisioned that make beneficial use of orbiting motion of the output member 25. An example is that of a mixing operation in which simultaneous rotation and orbiting motion may be desirable, e.g., when powering beaters of the type used to mix cement or to blend a food product. Other possible applications may find such 2DOF motion to be beneficial, such as in the propulsion systems of unmanned rovers or other special purpose vehicles, or in grinders, mixers, and washing machines.

Referring briefly to FIGS. 3 and 4, the above-noted 2DOF motion is represented schematically via a sequence of motion commencing at time t=0 and continuing until a future point in time t=t+1. FIG. 3 shows an example of cycloidal motion, such that the rotor 30, shown with circumferentially-spaced reference points 30X for illustrative clarity, has rotary motion radially within the surrounding stator 32. Such motion is indicated by the changing position of a representative reference point 30X* between t=0 and t=t+1. FIG. 4 shows orbiting motion, such that the rotor 30 "slides" around the inner circumferential surface 132 of the stator 32. Pure rotary motion, pure orbiting motion, or combinations of rotary and orbiting motion may be used in different applications, as noted above.

While 2DOF motion is enabled by the cycloidal electric machine 20, such motion may be less than optimal in terms of noise, vibration, and harshness (NVH). That is, unbalanced mechanical and magnetic forces may be provided by the disclosed cycloidal electric machine 20, which might cause excessive loads to be transmitted through bearings of the rotor 30 as well as imparting excessive loads to the stator 32. To smooth operation of the electric machine 20 and lower undesirable NVH effects, various approaches may be taken to help balance the electric machine 20.

Figures 5, 6:
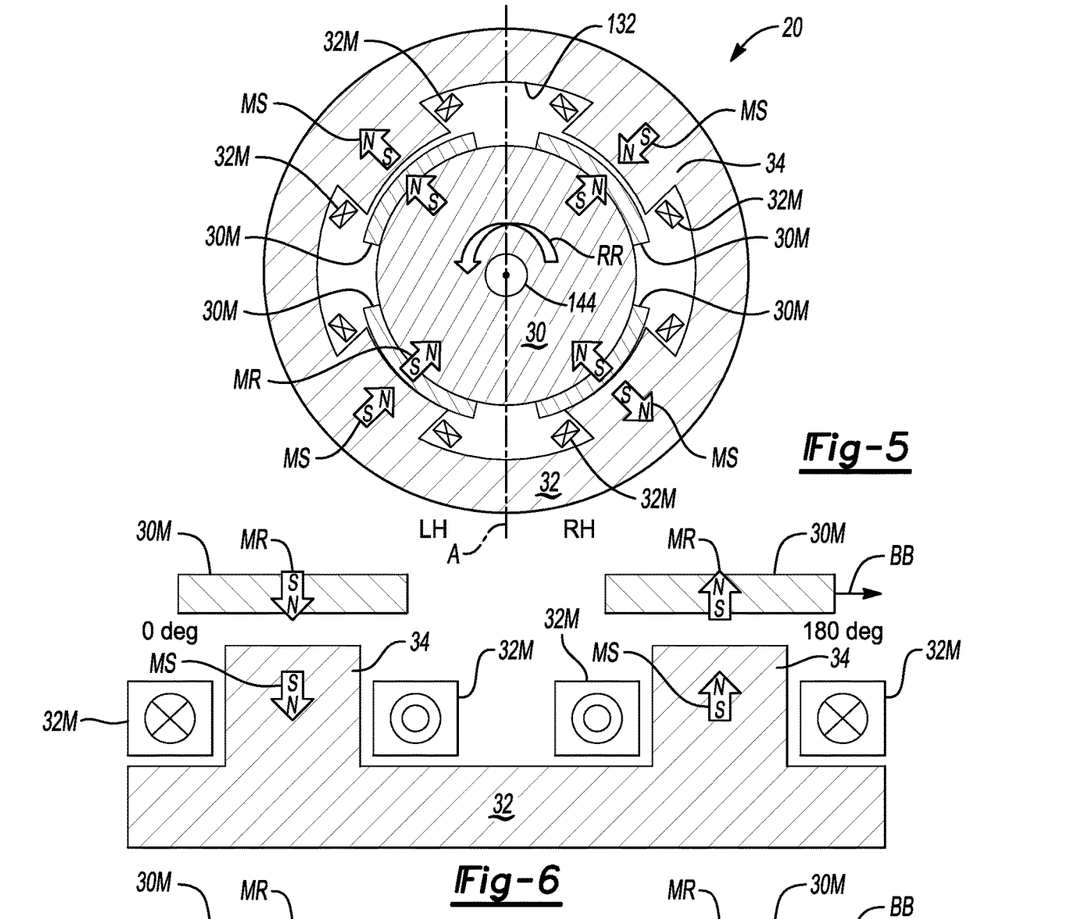
FIG. 5 is a schematic cross-sectional illustration of an embodiment of the cycloidal electric machine of FIG. 2 having surface-mounted rotor magnets.
FIGS. 6 and 7 are schematic cross-sectional illustrations of an instantaneous pole orientations for the cycloidal electric machine shown in FIG. 5.

Referring to FIG. 5, an example surface-mounted embodiment of the cycloidal electric machine 20, embodied as a reluctance machine as noted above, is depicted in which the stator 32 having stator teeth 34 circumscribes the rotor 30, with rotor 30 being cylindrical in the illustrated embodiment. The stator excitation circuit provides bi-directional current flow shown in FIGS. 6 and 7, i.e., current flows through different stator windings in opposite directions at a given instant in time, as opposed to being directed in one binary direction or the other. The cycloidal electric machine 20 is symmetrical with respect to a centerline A to define symmetrical left and right halves LH and RH, respectively, as viewed from the perspective of FIG. 5. Stator electromagnets 32M are formed by winding lengths of conductive wire around or inserting segments of conductive bars proximate the stator 34. Such stator teeth 34 protrude radially-inward from inner circumferential surface 132 of the stator 32, e.g., a cylindrical core and/or yoke of the stator 32, and thus define stator slots 32S therebetween.

Similarly, the permanent magnets 30M, hereinafter referred to as rotor magnets 30M for simplicity and clarity, may be ring-shaped or arcuate in cross-section as shown, and placed on and/or embedded within the rotor 30. Arrows MS and MR represent the direction of magnetization of the stator 32 and rotor 30, respectively, with the base of arrows MS and MR corresponding to the south (S) pole of magnets 32M and 30M, respectively, and the head of the arrows MS and MR corresponding to the north (N) pole. Arrow RR is the direction of rotation of the rotor 30 about a center of rotation corresponding to a point of rolling contact of the rotor 30 with the stator 32, which is opposite a direction of rotation of the rotor's output shaft, as will be appreciated.

In a typical non-cycloidal electric machine, the directions of magnetization indicated by respective arrows MS and MR would ordinarily be orthogonal with respect to each other, i.e., 90° apart, with the direction of magnetization of the rotor 30 being of a fixed orientation. Therefore, the above-described tangential forces present in the radial airgap between the stator 32 and rotor 30 would be generated to the exclusion of potentially beneficial radial forces. When the directions of magnetization are fully-aligned, however, i.e., 0° apart, such radial forces are generated in the stator-rotor airgap to the exclusion of tangential forces. Eccentricity of the rotor 30 thus enables beneficial use of the radial forces, with a pre-configured variation of the MMF alignment between 0° (fully radial) and 90° (fully tangential) possibly incorporated into the electric machine 20 to provide an application-specific radial/tangential force combination and corresponding performance advantage.

Figure 7:
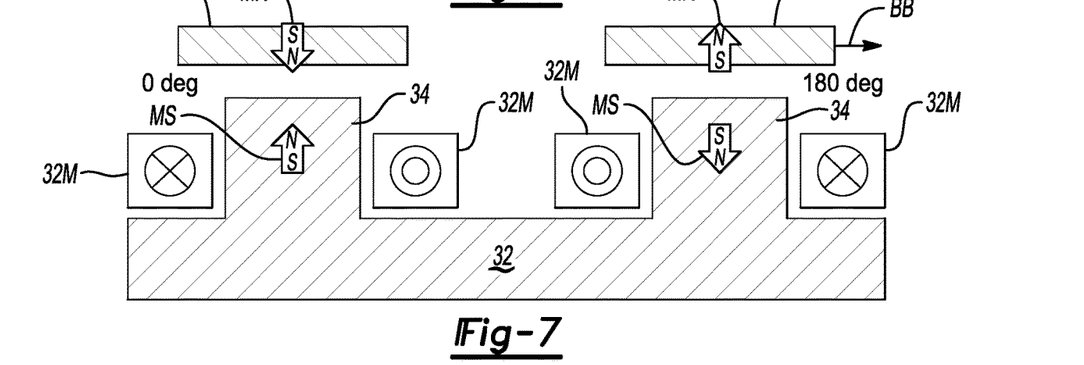

Excitation of symmetrical halves LH and RH at the particular instant in time shown in FIG. 5 is schematically depicted in FIGS. 6 and 7, respectively, with the rotor magnets 30M shown but the remaining structure of the rotor 30 omitted for illustrative simplicity. Rotation of the rotor 30 is generally indicated by arrow BB, but the rotor 30 may rotate in the opposite direction with respect to the direction of rotation of the stator field depending on its motor or generator operating mode. The symbols "X" and "O" represent the direction of electric current flow into ("X") and out of ("O") the page, respectively, in a given section of the stator electromagnet 32M. The annotations "0 deg" and "180 deg" refer to the relative position of the illustrated structure relative to each other.

As illustrated in FIG. 6 for the left half (LH) of electric machine 20, with the rotor 30 shown above the stator 32 according to convention, the stator electromagnets 32M that are located in symmetrical half LH are excited so that poles of the energized stator electromagnets 32M magnetically attract the poles of the oppositely-positioned rotor magnets 32M, i.e., adjacent north (N) and south (S) poles are magnetically attracted. This state of magnetic attraction is indicated by the alignment/same direction of the arrows MS and MR.

FIG. 7 represents an energized state of the windings in stator 32 in the right half (RH) at the same instant of time shown in FIG. 6. The stator electromagnets 32M located in half RH of FIG. 5 are excited such that the poles of the energized stator electromagnets 32M and those of oppositely-disposed rotor poles 32M magnetically repel each other. This state of magnetic repulsion is indicated by the opposing directions of arrows MS and MR, i.e., north (N) poles of the stator 32 and rotor 30 are oppositely disposed from each other, as are the south (S) poles.

As shown in FIGS. 6 and 7, as the polarity of a bidirectional AC input voltage feed into the stator electromagnets 32M changes, a lossless magnetic field provided by the purposefully-arranged rotor magnets 32M will magnetically attract and thereby boost the poles of stator 32 in symmetrical half RH or LH, and will magnetically repel the poles of the stator 32 in the opposite symmetrical half LH or RH. Proper polar orientation of the rotor magnets 30M with respect to the stator electromagnets 32M during manufacturing of the electric machine 20 thus ensures a desirable boost-repel action. In this manner, a useful rotor field may be provided in the cycloidal electric machine 20 to improve torque efficiency of the electric machine 20.

Figure 8:
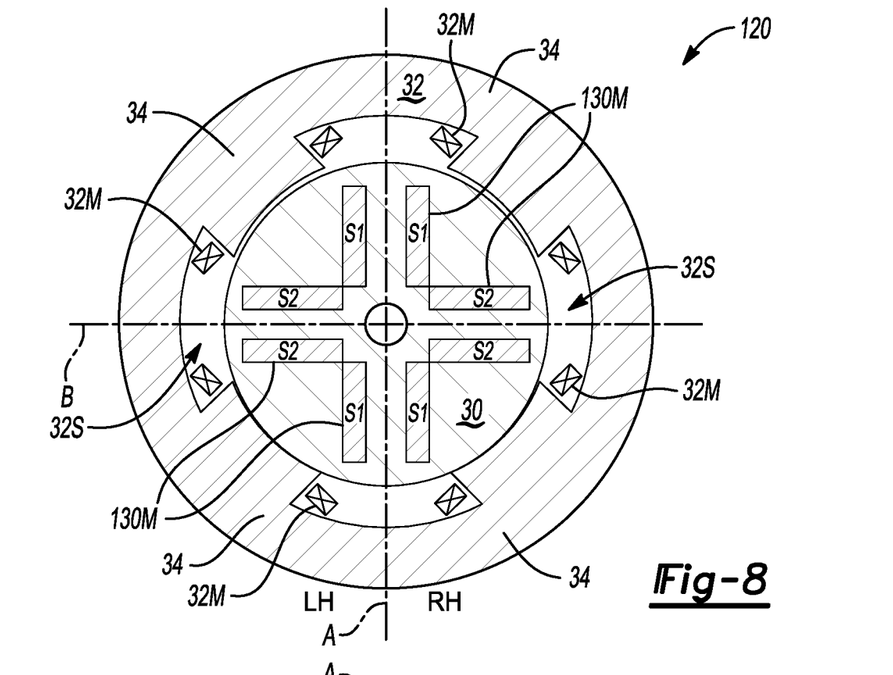
FIGS. 8 and 9 are schematic cross-sectional illustrations of alternative configurations of the cycloidal electric machine shown in FIG. 5 with embedded rotor magnets.
Figure 9:
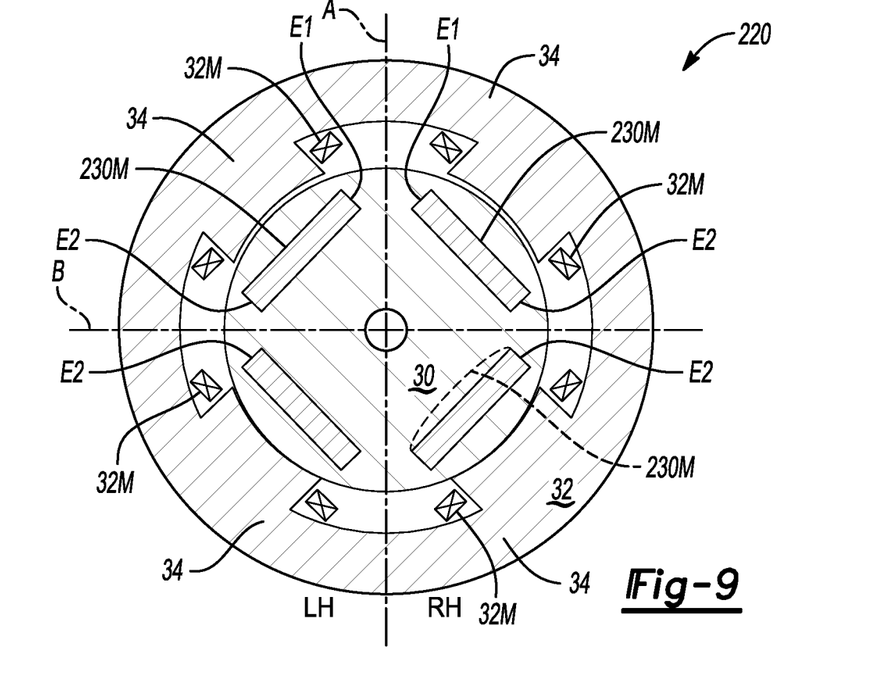

Referring to FIGS. 8 and 9, these same principles may be beneficially applied to inset/embedded embodiments of the electric machine 20 of FIGS. 5-7. As with the above-described surface-mounted variation, the depicted embodiments may be used with a switched-reluctance machine by embedding multiple rotor magnets 130M (FIG. 8) or 230M (FIG. 9) within the rotor 30 in a symmetrical manner with respect to symmetrical halves LH and RH. While arrows MS and MR indicative of the above-described direction of magnetization in the stator 32 and rotor 30 are omitted for clarity, such arrows may be superimposed on FIGS. 8 and 9.

That is, although the number, position, and/or orientation of the permanent magnets may vary, such magnets, which are shown as rotor magnets 130M and 230M in respective FIGS. 8 and 9, combine to direct magnetic flux in the directions shown generally in FIG. 5. The above-described attraction/repulsion effect is therefore achieved regardless of the many possible variations of arrangement of permanent magnets within the rotor 30.

In the example arrangement of FIG. 8, for instance, with axis A again dividing the electric machine 120 into the two symmetrical halves LH and RH as described with reference to the surface-mounted embodiment of FIG. 5, rotor magnets 130M may be symmetrically arranged relative to each of the axes A and B. The rotor magnets 130M may be segmented bar-style permanent magnets as shown, i.e., having orthogonally-arranged magnet segments S1 and S2. In each symmetrical half LH and RH, the permanent magnets 130M may be positioned back-to-back such that magnet segments S1 are parallel to axis A and magnet segments S2 are parallel to axis B.

Such an arrangement could entail using four permanent magnets 130M, each of which includes magnet segments S1 and S2 as shown. With respect to axis A, such an optional arrangement will result in a magnet segments S1 of different rotor magnets 130M being spaced apart and flanking the axis A. Likewise, a magnet segments S2 of different rotor magnets 130M will be spaced apart and flank axis B. As will be appreciated by one of ordinary skill in the art, the illustrated arrangement of FIG. 8 is exemplary and non-limiting, with the illustrated embodiment being just one possible way to precisely direct rotor flux opposite the stator electromagnets 32M.

FIG. 9 shows another example internal arrangement of rotor magnets 230M that may be used to produce magnetization in a direction similar to that which is indicated by arrows MR and MS in FIG. 5. In the illustrated configuration, non-segmented flat/planar rotor magnets 230M having opposing first and second ends E1 and E2 are embedded within laminations of the rotor 30. First end E1 of each of the rotor magnets 230M is oriented toward axis A in each symmetrical half LH and RH, while the oppositely-disposed second end E2 is oriented toward axis B. Viewed from the perspective of FIG. 9, such an arrangement may appear as an inverted-V. While rectangular rotor magnets 230M are shown, other configurations may be readily envisioned within the scope of the disclosure, including rotor magnets 230M having a "bread loaf"-type profile 230M* in which one or more of surfaces of the rotor magnets 230M is convex and/or has another non-flat profile.

In the various configurations described above with reference to FIGS. 5-9, the rotor magnets 30M, 130M, or 230M used in and/or on the structure of the rotor 30 and the electromagnets 32M of stator 32 may be equal in number, i.e., the same number of rotor magnets 30M, 130M, or 230M as electromagnets 32M. The cycloidal reluctance machine 20, particularly when configured as a switched reluctance machine, has an even number of rotor poles. The number of stator poles may be even or odd in different embodiments. Additionally, for optimal performance the stator 32 may be constructed to have a number of stator poles that is equal to the number of electrical phases, e.g., three stator poles for a three-phase AC excitation voltage. However, in other embodiments the number of rotor magnets 30M, 130M, or 230M may differ from the number of stator electromagnets 32M.

The electrical excitation of the individual stator windings forming the illustrated stator electromagnets 32M is ultimately determined based on the direction of the directional magnetic field provided by the rotor magnets 30M, 130M, or 230M, as well as a location of the stator electromagnets 32M with respect to a center of rotation of the cycloidal electric machine 20, 120, or 220, i.e., a rolling point at which the airgap between the rotor 30 and stator 32 is at its minimum. Likewise, the direction of magnetization could be parallel to the thickness of the various rotor magnets 30M, 130M, or 230M, or such a direction could be radially toward the center of the rotor 30. These and other features and benefits will be readily appreciated by one of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrical system comprising:
   a battery;
   a power inverter module (PIM) connected to the battery and outputting a polyphase voltage;
   a cycloidal reluctance machine having a rotor surrounded by a stator and radially-separated from the stator by an airgap, wherein:
   the rotor includes rotor magnets providing a rotor field, wherein the rotor magnets are permanent magnets;
   the stator includes stator windings positioned proximate the rotor magnets and electrically connected to the PIM to thereby form stator electromagnets providing a rotating stator field, wherein the rotor field is configured to augment the rotating stator field to thereby boost output torque of the cycloidal reluctance machine; and
   the rotor is eccentrically positioned with respect to the stator to move with two degrees of freedom (2DOF), the 2DOF including rotating motion about a rotary axis of the rotor and orbiting motion about a center axis of the stator; and
   a rotor constraint mechanism (RCM) configured to constrain motion of the rotor, such that the rotor is able to generate and transmit the output torque to a coupled load in at least one of the 2DOF.

2. The electrical system of claim 1, wherein the rotor magnets are surface-mounted to the rotor.

3. The electrical system of claim 2, wherein the rotor magnets are ring-shaped or arcuate.

4. The electrical system of claim 1, wherein the rotor magnets are embedded within the rotor.

5. The electrical system of claim 4, wherein each of the rotor magnets is segmented into first and second segments.

6. The electrical system of claim 5, wherein the rotor has orthogonally-arranged first and second axes such that the rotor has opposing symmetrical halves, the first and second segments are orthogonally-arranged with respect to each other, the first segments are parallel to the first axis, and the second segments are parallel to the second axis.

7. The electrical system of claim 5, wherein the rotor has orthogonally-arranged first and second axes such that the rotor has symmetrical halves, and wherein a respective first end of each of the rotor magnets is oriented toward the first axis in each symmetrical half, and a second end of the each of the rotor magnets is oriented toward the second axis in each symmetrical half.

8. The electrical system of claim 1, wherein a direction of magnetization of the rotor magnets is radial toward a center of the rotor.

9. The electrical system of claim 1, wherein the rotor magnets and the stator electromagnets are equal in number.

10. The electrical system of claim 1, wherein the coupled load is a drive axle of a vehicle.

11. A cycloidal reluctance machine comprising:
  a stator having a plurality of radial stator teeth between which are positioned a plurality of stator electromagnets;
  a rotor disposed radially within and surrounded by the stator and including rotor magnets configured as permanent magnets, wherein the rotor is separated from the stator by an airgap and is eccentrically positioned with respect to the stator to move with two degrees of freedom (2DOF), including rotating motion about a rotary axis of the rotor and orbiting motion about a center axis of the stator; and
  a rotor constraint mechanism (RCM) configured to constrain motion of the rotor, such that the rotor is able to generate and transmit output torque to a coupled load in at least one of the 2DOF;
  wherein:
    the stator electromagnets are positioned proximate the rotor magnets and provide a rotating stator field; and
    the rotor field is configured to augment the rotating stator field to thereby boost output torque of the cycloidal reluctance machine.

12. The cycloidal reluctance machine of claim 11, wherein the rotor magnets are mounted to an external surface of the rotor.

13. The cycloidal reluctance machine of claim 12, wherein the rotor magnets are ring-shaped or arcuate.

14. The cycloidal reluctance machine of claim 11, wherein the rotor magnets are embedded within the rotor.

15. The cycloidal reluctance machine of claim 14, wherein the rotor magnets are segmented.

16. The cycloidal reluctance machine of claim 15, wherein the rotor has orthogonally-arranged first and second axes such that the rotor has opposing symmetrical halves, the rotor magnets have orthogonally-arranged first and second segments, the first segments are parallel to the first axis, and the second segments are parallel to the second axis.

17. The cycloidal reluctance machine of claim 15, wherein the rotor has orthogonally-arranged first and second axes such that the rotor has symmetrical halves, and wherein a respective first end of each of the rotor magnets is oriented toward the first axis in each symmetrical half, and a second end of the each of the rotor magnets is oriented toward the second axis in each symmetrical half.

18. The cycloidal reluctance machine of claim 11, wherein a direction of magnetization of the rotor magnets is radial toward a center of the rotor.

19. The cycloidal reluctance machine of claim 11, wherein the rotor magnets and the stator electromagnets are equal in number.

20. The cycloidal reluctance machine of claim 11, wherein the coupled load is a drive axle of a vehicle.

* * * * *